United States Patent [19]

Ernohazy et al.

[11] 4,228,921
[45] Oct. 21, 1980

[54] APPARATUS FOR MEASURING LIQUID DEVELOPER FLOW RATE

[75] Inventors: Stephen Ernohazy, Mt. Prospect; Frederick D. Meller, Lomard; Eugene P. Oddo, Mt. Prospect, all of Ill.

[73] Assignee: AM International, Inc., Los Angeles, Calif.

[21] Appl. No.: 945,404

[22] Filed: Sep. 25, 1978

[51] Int. Cl.³ .............................................. G01F 11/32
[52] U.S. Cl. ........................................... 222/40; 73/3
[58] Field of Search ................... 222/23, 71, 40; 73/3, 73/215, 223

[56] References Cited

U.S. PATENT DOCUMENTS

| | | | |
|---|---|---|---|
| 1,005,839 | 10/1911 | Hoyt | 73/3 |
| 1,103,882 | 7/1914 | Kidder | 73/3 |
| 2,505,905 | 5/1950 | McAfee | 73/223 |
| 2,925,692 | 2/1960 | Hitchner | 73/3 X |
| 3,859,854 | 1/1975 | Dye et al. | 73/215 |

Primary Examiner—Stanley H. Tollberg
Attorney, Agent, or Firm—Anthony W. Karambelas; Robert S. Hulse; Robert C. Curfiss

[57] ABSTRACT

An apparatus and method are provided for measuring the flow rate of liquid developer in a diazotype copy machine. The liquid developer is supplied from a supply source to a flowmeter provided with a metering device for dispensing the liquid developer from the flowmeter to a reservoir mounted on the flowmeter. A valve is associated with the reservoir and is actuable between a closed condition for retaining the liquid developer in the reservoir and an open condition for draining the liquid developer from the reservoir. An indicator is provided on the reservoir for measuring the flow rate, subsequent to actuation of the valve from the open to the closed condition, and provides an indication of the quantity of liquid developer received by the reservoir relative to a predetermined time period.

8 Claims, 2 Drawing Figures

APPARATUS FOR MEASURING LIQUID DEVELOPER FLOW RATE

BACKGROUND OF THE INVENTION

In the use of liquid developer such as aqueous ammonia for developing exposed diazotype copy sheets, in order to obtain images of high quality it is necessary that the flow rate of the aqueous ammonia be accurately dispensed in controlled metered quantities to a developer system of the copy machine. Thus, to determine the flow rate and adjust the flow as required necessitates measuring the quantity of ammonia being dispensed.

Conventionally, such measuring of the ammonia flow rate requires disconnecting an end of a feed tube, which conveys the aqueous ammonia from a dispensing means to the developer system, from the dispensing means, receiving the ammonia being dispensed in a hand-held open measuring tube and timing the quantity of ammonia supplied to the measuring tube during a predetermined time duration. Since the measuring operation often occurs near or at eye-level, the person performing the operation is subject to an unnecessary hazard of exposure to the volatile aqueous ammonia.

SUMMARY OF THE INVENTION

The present invention provides for measuring aqueous ammonia flow in a diazotype copy machine in which the system for supplying the aqueous ammonia to the developer system is maintained in a substantially closed condition while the flow rate is being measured, thereby eliminating the hazard of the aqueous ammonia coming into direct contact with the person performing the measuring operation.

A pump is provided for supplying aqueous ammonia from a supply source to a flowmeter. The flowmeter includes a metering means for dispensing metered quantities of aqueous ammonia to a reservoir mounted on the flowmeter. Also provided is a valve means associated with the reservoir and actuable between a closed condition for retaining the aqueous ammonia in the reservoir and an open condition for draining the aqueous ammonia from the reservoir. Indicator means is provided on the reservoir means for measuring the flow rate, subsequent to actuation of the valve means from the open to the closed condition, providing an indication of the quantity of aqueous ammonia received by the reservoir relative to a predetermined time period. Any change required in the flow rate may be effected by operating the metering means of the flowmeter to either increase or decrease the amount of aqueous ammonia being dispensed by the metering means.

It is an object of the present invention to provide an improved measuring apparatus and method for measuring the aqueous ammonia flow rate in a diazotype copy machine.

Another object is to provide an aqueous ammonia flow measuring apparatus as an integral component of a substantially closed system to thereby eliminate any hazard of aqueous ammonia exposure to the person performing the measuring operation.

Another object is to provide a flowmeter means independent of a pump for supplying the aqueous ammonia from the supply source to the flowmeter means, and positioning the pump in close proximity to the supply source to provide a relatively short ammonia supply line from the supply source to the pump. This arrangement avoids interference of ammonia flow from the supply source to the pump as a result of vapor lock as associated with prior art devices utilizing a metering pump of integral construction and a relatively long ammonia supply line from the supply source to the pump.

A feature of the invention is to provide an aqueous ammonia flow measuring apparatus and method which are simple in construction and operation, inexpensive to produce and may be readily adapted to existing copy machines.

Other objects, features and advantages of the invention will appear hereinafter as the description proceeds.

IN THE DRAWING

FIG. 1 is a schematic illustration of a prior art arrangement for measuring the flow rate of aqueous ammonia in a diazotype copy machine; and FIG. 2 is a schematic illustration of an apparatus for measuring the flow rate of aqueous ammonia in a diazotype copy machine in accordance with the present invention.

DESCRIPTION OF THE PRIOR ART

As shown in FIG. 1, the prior art device comprises a combined pump and metering device 10 for supplying aqueous ammonia from an ammonia supply source 12 to a developer system 14 of a diazotype copy machine. The aqueous ammonia is pumped from the supply source 12 to the pump and metering device 10 via a supply tube 16 and is dispensed in metered amounts from the pump and metering device 10 by a needle valve 18. During normal machine operation, a feed tube 20 conveys the ammonia from the pump and metering device 10 to the developer system 14. However, as shown in FIG. 1, the feed tube 20 is disconnected from the pump and metering device 10 for purposes of measuring the ammonia flow rate as will be further explained hereinafter. Excess aqueous ammonia supplied to the pump and metering device 10 is returned to the supply source 12 by an overflow tube 22.

The foregoing represents only one prior art arrangement for supplying aqueous ammonia from the supply source to the developer system and other arrangements are also known. For example, a diaphragm pump, a bellows pump or a solenoid operated piston pump may be utilized to supply the aqueous ammonia to the developer system, whereby a variable flow rate of the aqueous ammonia is accomplished either with an adjustable stroke length or a variable motor RPM, or both.

To measure the aqueous ammonia flow rate in the prior art arrangement requires that the feed tube 20 be disconnected from a dispensing nozzle 24 of the pump and metering device 10 as shown in FIG. 1. Thereafter, a measuring tube or vial 26 having indicator marks 28 thereon is hand-held to receive aqueous ammonia droplets 30 from the dispensing nozzle 24. The person performing the measuring operation takes a reading of the aqueous ammonia supplied to the measuring tube 26, relative to the indicator marks 28, for a fixed time period to thereby measure the flow rate. The flow rate may be increased or decreased as required through adjustment of the needle valve 18. Following the measuring operation, the feed tube 20 is connected to the dispensing nozzle 24 of the pump and metering device 10.

It will be appreciated, the foregoing procedure subjects the person performing the measuring operation to the hazard of coming into direct contact with the volatile aqueous ammonia. This unnecessary risk is even more pronounced in those instances herein the measuring operation is performed at or near eye-level. Additionally, because the aqueous ammonia is dispensed from the pump and metering device 10 to the developer system 14 by gravity, it is necessary to mount the pump and metering device 10 at a proper position with respect to the developer system 14. Such an arrangement necessitates the use of a relatively long supply tube 16 from the supply source 12 to the pump and metering device 10 which frequently results in vapor lock problems causing interference with proper supply of aqueous ammonia from the supply source 12.

DESCRIPTION OF THE PREFERRED EMBODIMENT

Figure 1:
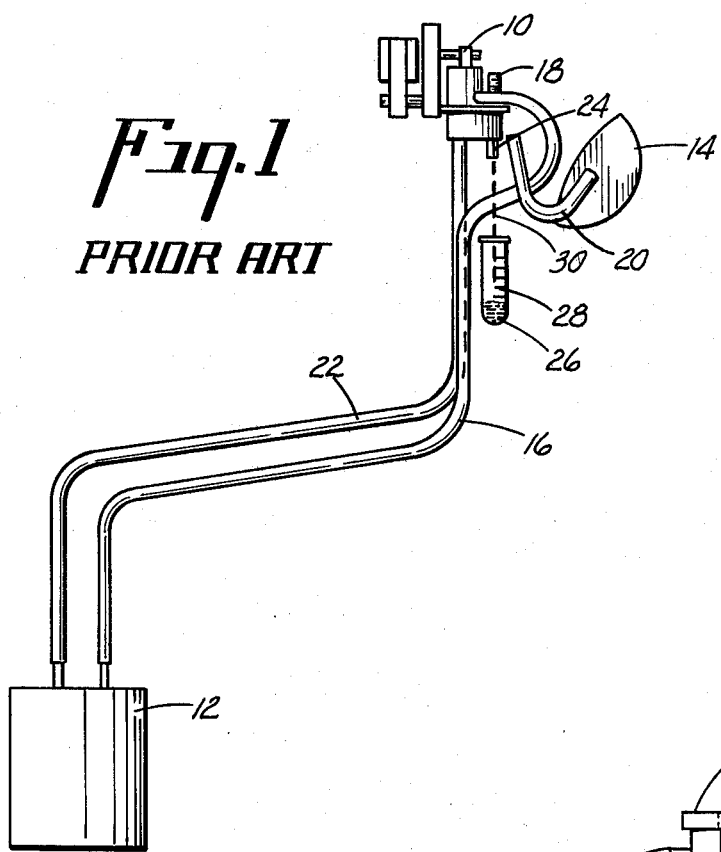
Figure 2:
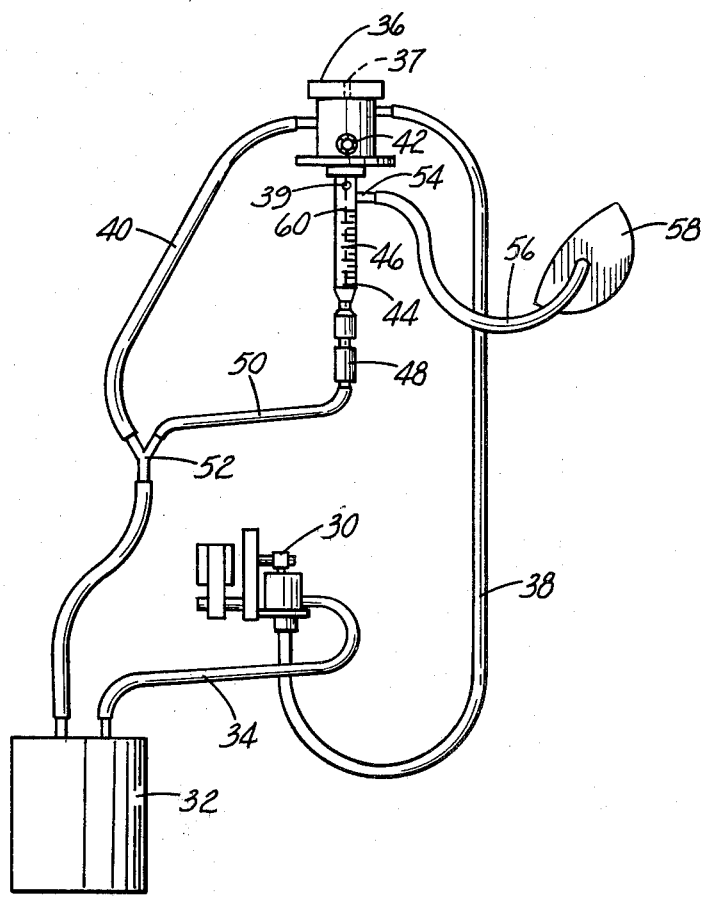

With reference to FIG. 2, there is provided a pump 30 for pumping aqueous ammonia from a supply source 32 via a suction tube 34, and for delivering the aqueous ammonia from the pump 30 to a flowmeter 36 via a pressure tube 38. Excess aqueous ammonia delivered to the flowmeter 36 is returned to the supply source 32 by an overflow tube 40. An adjustable metering means 42 is provided on the flowmeter 36 for dispensing selectively metered amounts of aqueous ammonia to a reservoir 44 mounted on the flowmeter 36. The reservoir 44 is preferably transculent and is provided with indicator means 46 in the form of calibrated graduations.

A valve means 48 is connected to the lower end of the reservoir 44 and to an end of a drain tube 50. The other end of the drain tube 50 is attached to a connector 52 of the overflow tube 40 for returning aqueous ammonia to the supply source 32. The valve means 48 may be a conventional pinch or squeeze type valve of the kind that provides a condition open to liquid flow in response to squeezing the valve, and provides a condition closed to liquid flow in response to release of the valve. The reservoir 44 also provides an outlet means 54 for connecting thereto an end of a feed tube 56 for conveying the aqueous ammonia from the reservoir 44 to a developer system 58 of the copying machine during normal machine operation.

During normal machine operation, the aqueous ammonia delivered to the flowmeter 36 provides a substantially hydrostatic head above the reservoir 44, whereby the aqueous ammonia is dispensed by gravity in metered droplets 60 from the flowmeter 36 to the reservoir 44. As the aqueous ammonia in the reservoir 44 rises to the level of the outlet means 54, it exits from the reservoir 44 into the feed tube 56 for further conveyance to the developer system 58. Except for vent means 37 on the flowmeter 36 and vent means 39 on the reservoir 60 to insure metered droplets 60 dispensation by gravity, the entire system is substantially closed to exposure of the aqueous ammonia or fumes thereof to the atmosphere. Also, because the flowmeter 36 and the metering means 42 for dispensing metered amounts of aqueous ammonia to the reservoir 44 are separated from the pump 30 for supplying the aqueous ammonia to the flowmeter, the pump may be positioned in close proximity to the supply source 32. This arrangement permits the use of a short suction tube 34 to thereby eliminate vapor lock problems as associated with prior art devices.

To measure the aqueous ammonia flow rate in the present invention, the person performing the operation need only actuate the valve means 48 by squeezing the same to the open condition to effect drainage of the aqueous ammonia from the reservoir 44 to the drain tube 50 for return to the supply source 32. Following drainage of the reservoir 44, the valve means 48 is actuated to the released or closed condition and the aqueous ammonia dispensed by the metering means 42 of the flowmeter 36 is dispensed in droplets 60 to the reservoir 44. The indicator means 46 on the reservoir 44 provides an indication of the quantity of aqueous ammonia received by the reservoir relative to a predetermined time period to thereby provide for safe and accurate measurement of the aqueous ammonia flow rate. The flow rate is adjusted to provide for the dispensement of aqueous ammonia at any desired rate as required for the particular application. Any adjustments to increase or decrease the flow rate may be effected through selectively adjusting the metering means 42 associated with the flowmeter 36.

From the foregoing, it will be appreciated that the present invention provides an apparatus and method for accurate measurement of aqueous ammonia flow in a simple and easy manner. Because the system is substantially closed, escape of undesirable ammonia fumes to the atmosphere is minimized and, more importantly, there is no safety hazard to the person performing the measuring operation insofar as being exposed to direct contact with the aqueous ammonia. Further, the provisions of independent pump and flowmeter means permit a considerable reduction in the distance the aqueous ammonia is conveyed from the supply source to the pump, thereby eliminating vapor lock problems in supplying the aqueous ammonia from the supply source to the developer system of the copy machine.

What is claimed is:

1. An apparatus for measuring the flow rate of aqueous ammonia in a diazotype copy machine, comprising:
   a supply source for aqueous ammonia;
   a flowmeter means;
   means for supplying the aqueous ammonia from the supply source to the flowmeter means;
   metering means for dispensing metered quantities of the aqueous ammonia from the flowmeter means;
   reservoir means mounted on the flowmeter means for receiving the aqueous ammonia dispensed therefrom;
   valve means actuable between a closed condition for retaining the aqueous ammonia in the reservoir means and an open condition for draining the aqueous ammonia from the reservoir means; and
   indicator means on the reservoir means for measuring the flow rate, subsequent to actuation of the valve means from the open to the closed condition, providing an indication of the quantity of aqueous ammonia received by the reservoir means relative to a predetermined time period.

2. An apparatus as set forth in claim 1 further comprising means for adjusting the metering means for dispensing selectively metered quantities of aqueous ammonia.

3. An apparatus as set forth in claim 1 further comprising means for supplying aqueous ammonia to a developer system of the copy machine during normal machine operation, comprising:
   a feed tube for conveying the aqueous ammonia from the reservoir to the developer system;
   outlet means on the reservoir means for exit of the aqueous ammonia from the reservoir means to the feed tube; and overflow means for returning to the supply source excess aqueous ammonia supplied to the flowmeter means.

4. An apparatus as set forth in claim 1 in which the supply means supplies an excess amount of aqueous ammonia to the flowmeter means to provide a substantially hydrostatic head above the reservoir means for gravity flow of the aqueous ammonia to the reservoir means under control of the metering means, further comprising overflow means for returning excess aqueous ammonia from the flowmeter means to the supply source.

5. An apparatus as set forth in claim 1 in which the valve means is asociated with a drain tube for returning aqueous ammonia from the reservoir means to the supply source in response to actuation of the valve means to the open condition.

6. An apparatus for measuring the flow rate of aqueous ammonia in a diazotype copy machine, comprising:
   a supply source for aqueous ammonia;
   a flowmeter means;
   pump means for supplying the aqueous ammonia from the supply source to the flowmeter means;
   metering means for dispensing metered amounts of the aqueous ammonia from the flowmeter means;
   reservoir means mounted on the flowmeter means for receiving the aqueous ammonia dispensed by the metering means;
   valve means manually actuable between a closed condition for retaining the aqueous ammonia in the reservoir means and an open condition for draining the reservoir means of the aqueous ammonia therein; and
   indicator means on the reservoir means for measuring the flow rate, subsequent to drainage of the reservoir means, providing an indication of the quantity of aqueous ammonia received by the reservoir means relative to a predetermined time period.

7. An apparatus as set forth in claim 6 in which the pump means is mounted in close proximity to the supply source and the flowmeter means is positioned proximate a developer system of the copy machine,
   whereby the aqueous ammonia is conveyed in a minimum distance between the supply source and the pump means to avoid vapor lock problems in supplying the aqueous ammonia from the supply source.

8. An apparatus as set forth in claim 6 further comprising vent means associated with the flowmeter means and with the reservoir means to insure metered amounts of aqueous ammonia dispensation by gravity.

* * * * *